(12) United States Patent
Ma et al.

(10) Patent No.: US 9,992,256 B2
(45) Date of Patent: Jun. 5, 2018

(54) DISTRIBUTED COMPUTING IN R

(71) Applicant: HEWLETT PACKARD ENTERPRISE DEVELOPMENT LP, Houston, TX (US)

(72) Inventors: Edward Ma, Sunnyvale, CA (US); Indrajit Roy, Palo Alto, CA (US); Vishrut Gupta, Sunnyvale, CA (US); Meichun Hsu, Sunnyvale, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 173 days.

(21) Appl. No.: 15/230,050

(22) Filed: Aug. 5, 2016

(65) Prior Publication Data

US 2018/0041562 A1 Feb. 8, 2018

(51) Int. Cl.
*H04L 29/08* (2006.01)
*H04L 12/24* (2006.01)

(52) U.S. Cl.
CPC .............. *H04L 67/02* (2013.01); *H04L 41/14* (2013.01); *H04L 67/10* (2013.01)

(58) Field of Classification Search
CPC ............................ H04L 67/10; H04L 29/08135
See application file for complete search history.

(56) References Cited

U.S. PATENT DOCUMENTS

| | | | | |
|---|---|---|---|---|
| 9,189,290 B2* | 11/2015 | Roy | ...................... | G06F 9/5066 |
| 2013/0132967 A1* | 5/2013 | Soundararajan | ...... | G06F 9/5066 718/104 |
| 2013/0262425 A1* | 10/2013 | Shamlin | ............ | G06F 17/30566 707/703 |
| 2014/0033214 A1* | 1/2014 | Venkataraman | ...... | G06F 9/5066 718/102 |
| 2014/0282594 A1* | 9/2014 | Roy | ...................... | G06F 9/5066 718/105 |
| 2015/0106796 A1* | 4/2015 | Schuler | ............... | G06F 9/44521 717/148 |

* cited by examiner

Primary Examiner — Lashonda T Jacobs

(57) ABSTRACT

Examples disclosed herein relate to distributed computing in R. Some examples disclosed herein may include identifying a distributed multivariate apply (dmapply) operation and an invocation of a distributed computing backend and determining a function referenced in the dmapply operation. A distributed backend driver associated with the invoked distributed computing backend may translate the determined function to a function native to an R application programming interface (API) of the invoked distributed computing backend and may provide the translated function to the invoked distributed computing backend to perform the translated function on a distributed data set referenced in the dmapply operation.

20 Claims, 4 Drawing Sheets

DISTRIBUTED COMPUTING IN R

BACKGROUND

R is a widely used programming language and software environment for statistical computing and data analysis. Due to R's popularity for data analysis, many distributed computing systems include an application programming interface (API) that allows developers to create and execute R programs in a distributed environment. Developers may therefore perform distributed computation on big data sets while continuing to program in the familiar R language.

BRIEF DESCRIPTION OF THE DRAWINGS

The following detailed description references the drawings, wherein.

DETAILED DESCRIPTION

Figure 1:
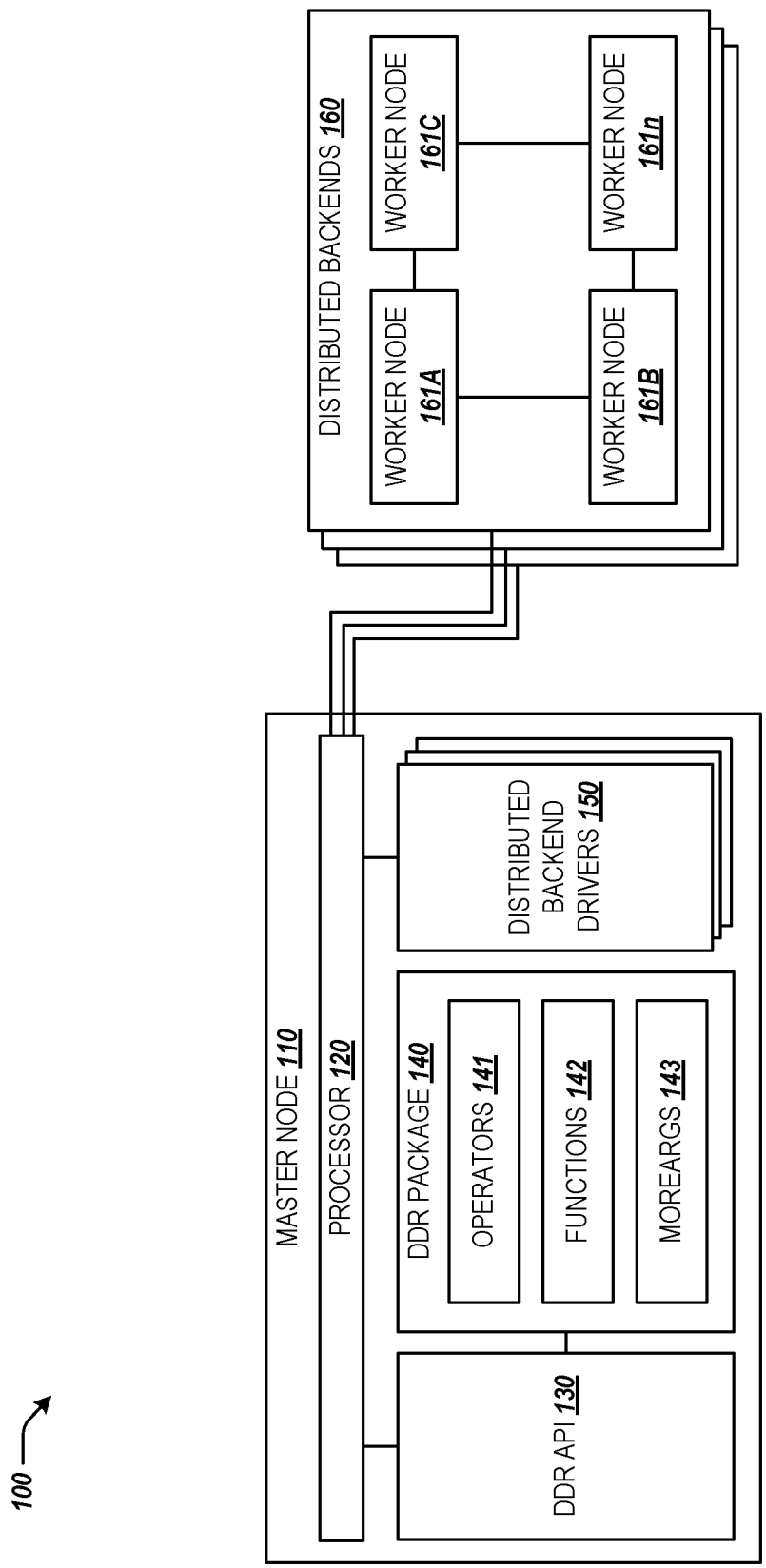
FIG. 1 is a block diagram of an example system for distributed computing in R.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

In some implementations, R APIs for distributed computing systems may be custom to a particular distributed computing system. For example, an application written for a particular R API may include numerous low-level implementation details specific to the associated distributed computing system. Accordingly, an application written for an R API of one distributed computing system may not run on other distributed computing systems. This lack of portability drives developers to write different versions of the same R application so that each version can run on a different distributed computing system.

Examples disclosed herein describe technical solutions to these technical challenges by providing systems, methods, and computer-readable media for distributed computing in R. In the disclosed examples, a distributed data structures in R (ddR) system may standardize distributed computing in R by providing a framework that allows R applications to execute on any distributed computing system, The ddR system may provide a unified programming primitive, distributed multivariate apply (dmapply), which provides for functional semantics. The dmapply primitive may make calls to distributed backend drivers that translate standardized functions to functions native to R APIs of distributed computing systems. Accordingly, the ddR system allows developers write R programs in a single R API while having the ability to translate the R programs to R APIs native to any distributed computing system. Developers are therefore provided with the flexibility to choose different distributed computing systems on which to execute their R programs without sacrificing performance.

In some examples, a dmapply operation and an invocation of a distributed computing backend is received and a function referenced in the dmapply operation is determined. Using a distributed backend driver associated with the invoked distributed computing backend, the determined function is translated to a function native to an R API of the invoked distributed computing backend and to the invoked distributed computing backend. The invoked distributed computing backend may perform the translated function on a distributed data set referenced in the dmapply operation.

FIG. 1 is a block diagram of an example distributed computing system 100 for distributed computing in R. Distributed computing system 100 may be implemented by a single computing system or a plurality of computing systems. A computing system, as used herein, may be any type of computing system including, but not being limited to: a laptop, a desktop, an all-in-one device, a thin client, a workstation, a tablet computer, a mobile device, a network-enabled appliance (e.g., a "Smart" television), an Internet of Things (IoT) sensor, a server device, and a storage device.

As shown in FIG. 1, distributed computing system 100 may include a number of components such as a master node 110 and a plurality of distributed backends 160. The number and arrangement of these components is an example only and provided for purposes of illustration. Other arrangements and numbers of components may be utilized without departing from the examples of the present disclosure.

Distributed backends 160 may include various distributed computing backends having an associated R API. Example distributed backends 160 include Apache® Spark™ (associated with a SparkR API), Apache® Hadoop™ (associated with an RHadoop API), RevoScaleR, Hewlett Packard Enterprise (HPE) Distributed R, parallel, and SNOW. Each of distributed backends 160 may be a distributed computing backend that includes a plurality of worker nodes 161A-161*n*. In some examples, each of distributed backends 160 may be implemented by a standalone computing system, where each of worker nodes 161A-161*n* is implemented by a processor or physical/logical processing core. In some examples, distributed backends 160 may be implemented by a single computing system, where each of worker nodes 161A-161n is implemented by a processor or physical/logical processing core. In some examples, each of distributed backends 160 may be implemented by a plurality of computing systems, where each of worker nodes 161A-161n are implemented by a standalone computing system. In some examples, distributed backends 160 may be implemented as a combination of the above.

In some examples, each R API of with distributed backends 160 may be custom to its associated distributed backend, Developers that wish to generate R applications to run on distributed backends 160 may learn the low-level implementation details exposed by the R APIs for each of distributed backends 160. However, R applications generated for one of distributed backends 160 using an associated R API may not run on the other distributed backends of distributed backends 160. For example, the Apache® Spark™ R API, SparkR, may expose developers to numerous low-level implementation details particular to Spark™. A developer may learn the Apache® Spark™ low-level implementation details to generate R applications to run on Apache® Spark™ using the SparkR API. However, the R applications generated to run on Apache® Spark™ via the SparkR API may not run on a RevoScaleR backend or a HPE Distributed R backend.

To address, among other things, the lack of portability of R applications, and to reduce the learning curve of writing distributed applications in R, master node 110 may serve as the front end for distributed computing system 100 and may manage distributed backends 160. Master node 110 may allow developers to generate R applications via a ddR API 130 using a ddR package 140. The R applications generated via ddR API 130 may be translated to R APIs of the different distributed backends 160 using a plurality of distributed backend drivers 150. Accordingly, developers may learn the low-level implementation details of a single R API (i.e., ddR API 130) to generate R applications that can run on a plurality of distributed backends 160.

In some examples, master node 110 may be implemented as a standalone computing system or computing systems. For example, master node 110 may be implemented by a computing system that includes a processor 120, such as a central processing unit (CPU), a dedicated integrated circuit such as an ASIC (application-specific integrated circuit), or a dedicated FPGA (field-programmable gate array). Processor 120 may be a single processor or a plurality of processors. In some examples, master node 110 may be implemented as a combination of electronic circuitry (i.e., hardware) and software/firmware included in computing system 100 that implements the functionality of master node 110. For example, computing system 100 may include processor 120 that executes instructions (e.g., stored on a machine-readable storage medium of distributed computing system 100) to offer the functionality of master node 110. In some examples, ddR API 130, ddR package 140, and distributed backend drivers 150 may be included in master node 110 as software/firmware instructions (e.g., stored in/on a machine-readable storage medium of distributed computing system 100 or another location) that, when executed by processor 120, offer the functionality of ddR API 130, ddR package 140, and distributed backend drivers 150.

ddR API 130, when executed by processor 120, may provide an R API for developers to generate R applications for distributed computing in R. Developers may generate R applications via ddR API 130 using ddR package 140. ddR package 140 may provide various operators 141, functions 142, and moreargs 143.

Operators 141 may define different distributed operators that follow R's functional-programming paradigm. Operators 141 may include a set of distributed data structure operators that may define different types of distributed data structures on which worker nodes 161A-161n of distributed backends 160 may operate. Examples of distributed data structure operators 141 may include distributed arrays (darray), distributed frames (dframe), and distributed lists (dlist). Each of these distributed data structure operators 141 may correspond to a non-distributed R data structure. For example, distributed lists may correspond to R lists, distributed arrays may correspond to R matrices, and distributed frames may correspond to R data frames. The distributed data structure operators 141 may have similar interfaces for access, summary statistics, metadata, and mutation such that the distributed data structures feel familiar to developers.

When executed by processor 120, distributed data structure operators 141 may partition data sets into distributed data sets having specified types of distributed data structures. Users may call the darray, dframe, and dlist operators 141 via ddR API 130. Data sets may be partitioned into distributed lists using dlist by generating a plurality of rows or columns from the data set. Distributed lists may store sequences of elements where each element may be a data type. Data sets may be partitioned into distributed arrays using darray. Distributed arrays may store data of a single type and may represent vectors and matrices. A distributed array may be used for dense arrays, where each element in a cell is assigned a value, as well as for sparse arrays, which may be stored in a column compressed format. Data sets may be partitioned into distributed frames using the dframe. Distributed frames may be similar to distributed arrays except that each column of a distributed frame may store elements of a different type. Unlike the dust data structure 142, darray and dframe may partition a data set by rows, columns, and blocks (i.e., two-dimensional partitioning). The above three distributed data structures may be used to express many real-world applications.

The distributed data structure operators 141 may include an argument, nparts(x,y), which allows developers to specify, via ddR API 130, how a data set is to be partitioned. As an example, to partition a 4×4 matrix data set into rows, a developer may call darray(nparts=(4,1)), where the darray data structure 142 partitions the 4×4 matrix into a distributed array using the nparts argument to generate four single-row partitions. As another example, a developer may call darray (nparts=(2,2)) to partition the 4×4 matrix into four 2×2 blocks.

Partitions of distributed data sets may be stored across a plurality of servers (not shown). Each partition of a distributed data set may be stored on the same server, different servers, or a combination thereof. Each partition may include metadata associated with the distributed data set, such as the location and size of each partition included in the distributed data set. The servers storing partitions of a distributed data set may provide the partitions to worker nodes 161A-161n of distributed backends 160 so that worker nodes 161A-161n may operate on the partitions.

Operators 141 may include various "apply" operators, such as a distributed multivariate apply (dmapply) operator and a simplified version of the dmapply operator for distributed lists, dlapply. dmapply and dlapply may be used to apply various functions 142 to distributed data sets that provide distributed and concurrent operation on the distributed data sets. dmapply and dlapply may also apply various moreargs 143 to augment and/or modify applied functions 142. The combination of functions 142 and moreargs 143 provide developers with a flexible way to express a multitude of computation types and communication patterns on distributed data sets.

Functions 143 may define different functions for performing various types of data computations on distributed data sets. Functions 143 may include R functions such as sum (sums elements in a specified data set), colMeans (averages individual columns), summary (obtains the min, max, and quantile measurements), rbind (combines two arrays) rowSums (sums individual rows), and tail (lists the last few elements in a data set); machine learning algorithms such as k-means for performing clustering, classification, and regression; and user-generated functions such as genData (for generating data structures). The above functions are examples only and many other functions may be used in dmapply and dlapply operations.

Moreargs 144 may be an argument used as a way to specify global data sets that are to be made available to each of worker nodes 161A-161n executing functions 143 on a distributed data structure as input to functions 143. The global data sets may be standard R data structures as well as the distributed data structures defined by data structures 142, and subsets or portions thereof. Example data sets passable by moreargs 144 include constants (e.g., MoreArgs=list (z=1), specifying a constant of 1), distributed data sets (e.g., MoreArgs=list(parts(A)[3]), specifying partition number three of a distributed data set A), decision trees (e.g., MoreArgs=list(data=A, ntrees=50), specifying 50 decision trees generated from data structure A), vectors, lists, matrices, frames, etc., and subsets thereof.

Operators 141 may include a backend invocation operator, useBackend. useBackend may be called via ddR API 130 and may be used to invoke different distributed backends 160. For example, to invoke an Apache® Hadoop™ backend, a developer may call useBackend(hadoop) via ddR API 130. Similarly, to invoke a HPE Distributed R backend, a developer may call useBackend(distributedR) via ddR API 130. Invoked distributed backends 160 may be used to perform functions included in dmapply and dlapply operations.

Operators 141 may include a collection operator, collect. The collect operator may be used to collect distributed data sets resulting from functions performed by worker nodes 161A-161n. The resulting distributed data sets may be collected from worker nodes 161A-161n at master node 110.

Processor 120 may, using ddR package 140, identify dmapply operations received via R API 130 and determine functions 143, distributed data sets, and/or moreargs 143 referenced in the identified dmapply operations. dmapply operations may follow the syntax of dmapply([FUNCTION], [DISTRIBUTED DATA SET], [MOREARGS]).

Processor 120 may execute various distributed backend drivers 150. Distributed backend drivers 150, when executed by processor 120, may be used by processor 120 to translate determined functions 142 and moreargs 143 to functions native to R APIs associated with distributed backends 160. Each of distributed backend drivers 150 may be associated with a distributed backend among distributed backends 160. A distributed backend driver may be configured to with and understanding of the low-level implementation details of the R API of its associated distributed backend. Processor 120 may use the low-level implementation details in the distributed backend driver to translate functions received in dmapply operations to functions native to the R API of its associated distributed backend. Processor 120 may determine which distributed backend driver among distributed backend drivers 150 to use for translating functions based on the invoked distributed backend (i.e., the distributed backend invoked using invoked using the backend invocation operator useBackend). For example, processor 120 may determine the distributed backend driver among distributed backend drivers 150 that is associated with the invoked distributed backend.

In some examples, a distributed backend driver may include a direct mapping between functions received in dmapply operations and the corresponding native functions. Processor 120 may use the distributed backend driver to translate functions received in dmapply operations directly to functions native to the R API of its associated distributed backend using the direct mapping. In some examples, R APIs of distributed backends 160 may have specialized native functions that do not directly map to the functions available in functions 142. Processor 120, using distributed backend driver, may determine that the R API of its corresponding distributed backend has a more optimized native function available to implement a function referenced in a dmapply and may override the referenced function with the more optimized native function. For example, a developer implement a generic groupBy function on an Apache® Spark™ backend using dlist with kXp partitions, where k is the number of grouping classes and p is the number of partitions of the distributed data set to be grouped, and then shuffle the partitions using parts in dmapply. Processor 120, using the distributed backend driver associated with Apache® Spark™, may determine that SparkR provides a more optimized groupBy function and may override the generic groupBy function by translating the generic groupBy function to SparkR's native groupBy function.

The distributed data sets referenced in a dmapply operation may be the distributed data sets on which translated function(s) are to be performed. Processor 120 may provide translated functions to the invoked distributed backend among distributed backends 160 so that the invoked distributed backend may perform the translated function on the distributed data set referenced in the dmapply operation. Each worker node 160A-160n of the invoked distributed backend may perform a translated function on a partition of the distributed data set referenced in the dmapply operation.

Developers may specify an entire distributed data set, a plurality of distributed data sets, subsets of partitions of distributed data set(s), and combinations thereof in dmapply operations. Processor 120 may determine the worker nodes 161A-161n of an invoked distributed backend among distributed backends 160 that have partitions, or subset of partitions, of the distributed data sets referenced in dmapply operations and may provide the translated function(s) to those worker nodes 161A-161n to perform the translated function(s) on the associated partitions or subset of partitions. Providing the translated function(s) to worker nodes 161A-161n having the partitions of the distributed data sets referenced in dmapply operations ensures that no data shuffling between worker nodes 161A-161n occurs.

To specify an entire distributed data set, developers may simply generate the distributed data set and reference the generated distributed data set in a dmapply operation. For example, a developer may generate two distributed lists, A and B, using the data structure operator dlist by calling A<-dlist(1, 2, 3, 4) and B<-dlist(11, 12, 13, 14). To perform a sum function on A and B, a developer may call C<-dmapply (FUN=sum, A, B). Accordingly, in the above example, elements in A and B may be to generate the resulting distributed data set C as dlist(12, 14, 16, 18).

To perform translated functions on a portion of a distributed data set, developers may include an argument, parts ([DISTRIBUTED DATA SET])[PARTITON$_a$:PARTITION$_n$], that allows developers to specify the partitions of a distributed data set on which the functions are to be performed by worker nodes 161A-161n. Processor 120 may provide the translated function to each of worker nodes 161A-161n of the invoked distributed backend so that each of worker nodes 161A-161n may perform the translated function on a partition of the specified subset of partitions included in a dmapply operation. As an example, to perform a length function on partitions 1 and 2 of a distributed array A (which determines the lengths of partitions 1 and 2), a developer may call dmapply(length, parts(A)[1:2]). Processor 120 may determine the worker nodes 161A-161n of an invoked distributed backend among distributed backends 160 that have partitions 1 and 2 of distributed list A on which the translated function of the length function are to be performed and provide the translated function to those worker nodes.

Processor 120 may determine how worker nodes 161A-161n are to perform translated functions on distributed data sets referenced in dmapply operations and provide instructions to worker nodes 161A-161n based on the determinations. As an example, processor 120 may determine that an entire distributed data set is referenced in a dmapply operation and may provide instructions to worker nodes 161A-161n of the invoked distributed backend to perform the translated function on each element of the referenced distributed data set based on the determination. As another example, processor 120 may determine that a subset of partitions of a distributed data set is referenced in a dmapply operation and may provide instructions to worker nodes 161A-161n of the invoked distributed backend to perform the translated function on each of the subset of partitions at a time instead of each element of the referenced distributed data set.

In some examples, processor 120 may determine how worker nodes 161A-161n are to perform translated functions based on the type of distributed data structures of distributed data sets referenced in dmapply operations. Elements in a distributed list may be iterated upon one row at a time; elements in a distributed array may be iterated upon one cell at a time in column major order; and elements in a distributed frame may be iterated upon one column at a time.

In some examples, processor 120 may determine global data sets, or subsets thereof, referenced in the MOREARGS portion of dmapply operations. The determined global data sets may be any of the moreargs 143 data sets, or portions or subsets thereof, referenced above. The determined global data sets may be provided to each of worker nodes 161A-161n of an invoked distributed backend so that worker nodes 161A-161n may perform translated functions on distributed data structures using the determined global data sets as input to the translated functions. In some examples, where processor 120 determines that the global data set is directly referenced in the MOREARGS portion of a dmapply operation (e.g., where the MOREARGS portion specifies a constant of 10), processor 120 may provide the determined global data set along with the translated function to worker nodes 161A-161n. In some examples, where processor 120 determines that the global data set referenced in the MOREARGS portion of a dmapply operation is a distributed data structure (or portion thereof), processor 120 may provide instructions to worker nodes among worker nodes 161A-161n having portions of the referenced global data set along to provide those portions to the worker nodes among worker nodes 161A-161n performing the translated functions.

In some examples, worker nodes 161A-161n of distributed backends 160 may perform translated functions on iterations of distributed data sets. For example, processor 120 may identify a first dmapply operation and an invocation of a distributed backend received via ddR API 130, and may determine a first function referenced in the first dmapply operation. Processor 120 may translate, using a distributed backend driver among distributed backend drivers 150 associated with the invoked distributed backend, the first function to a first function native to the R API of the invoked distributed backend. Processor 120 may provide the translated first function to the invoked distributed backend so that the invoked distributed backend may generate an intermediate distributed data set by performing the translated first function on an initial distributed data set referenced in the first dmapply operation. Processor 120 may identify a second dmapply operation and determine a second function referenced in the second dmapply operation. Processor 120 may translate, using the distributed backend driver associated with the invoked distributed backend, the second function to a second function native to the R API of the invoked distributed backend, and may provide the translated second function to the invoked distributed backend to generate a final distributed data set by performing the translated second function on the intermediate distributed data set.

Figure 2:
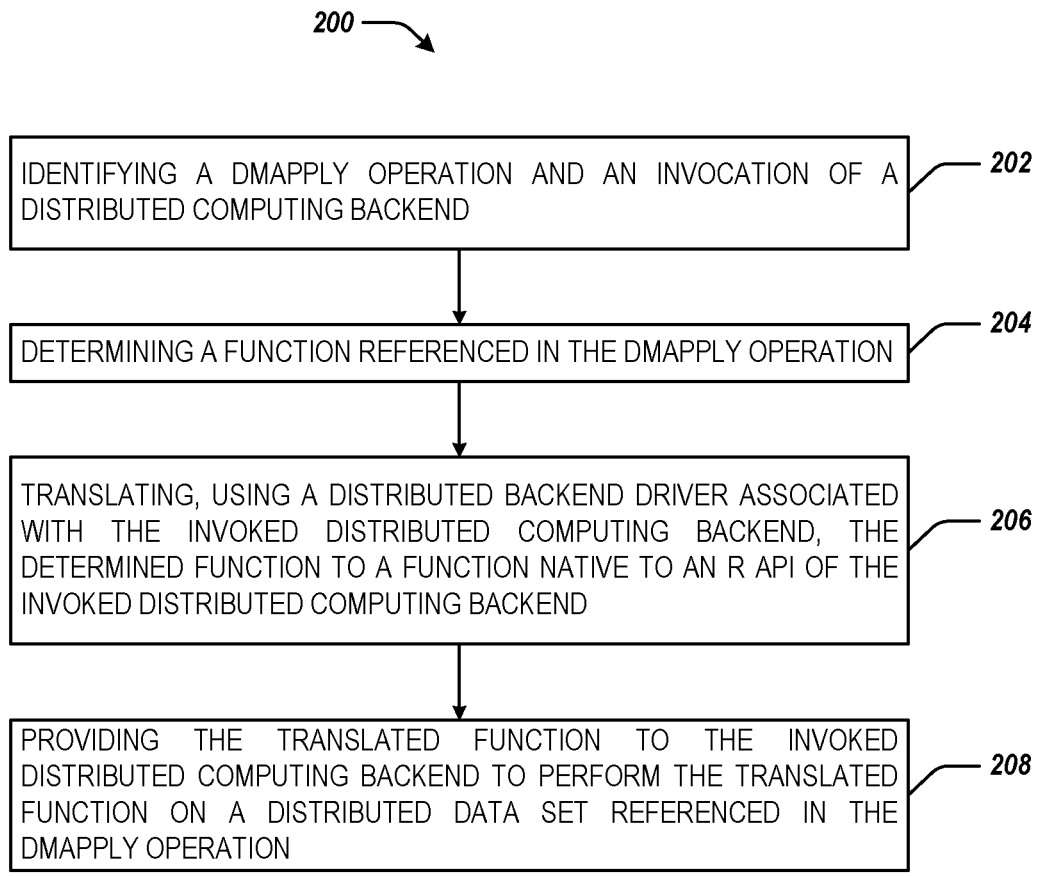
FIG. 2 is a flowchart of an example method for distributed computing in R.

FIG. 2 is a flowchart depicting an example method 200 for distributed computing in R. Method 200 may be executed or performed, for example, by some or all of the system components described above in computing system 100 of FIG. 1. Other suitable computing systems may be used as well. Method 200 may be implemented in the form of executable instructions stored on at least one machine-readable storage medium of the system and executed by at least one processor of the system. Alternatively or in addition, method 200 may be implemented in the form of electronic circuitry (e.g., hardware). In some examples, steps of method 200 may be executed substantially concurrently or in a different order than shown in FIG. 2. In some examples, method 200 may include more or less steps than are shown in FIG. 2. In some examples, some of the steps of method 200 may, at certain times, be ongoing and/or may repeat.

At block 202, method 200 may include identifying a dmapply operation and an invocation of a distributed computing backend. Referring back to FIG. 1, processor 120 of master node 110 may be responsible for implementing block 302.

At block 204, method 300 may include determining a function referenced in the dmapply operation, Referring back to FIG. 1, processor 120 of master node 110 may be responsible for implementing block 204.

At block 206, method 300 may include translating, using a distributed backend driver associated with the invoked distributed computation backend, the function determined at block 204 to a function native to an R API of the invoked distributed computing backend. Referring back to FIG. 1, processor 120 of master node 110 may be responsible for implementing block 206.

At block 208, method 300 may include providing the translated function to the invoked distributed computing backend to perform the translated function on a distributed data set referenced in the dmapply operation. Referring back to FIG. 1, processor 120 of master node 110 may be responsible for implementing block 208.

Figure 3:
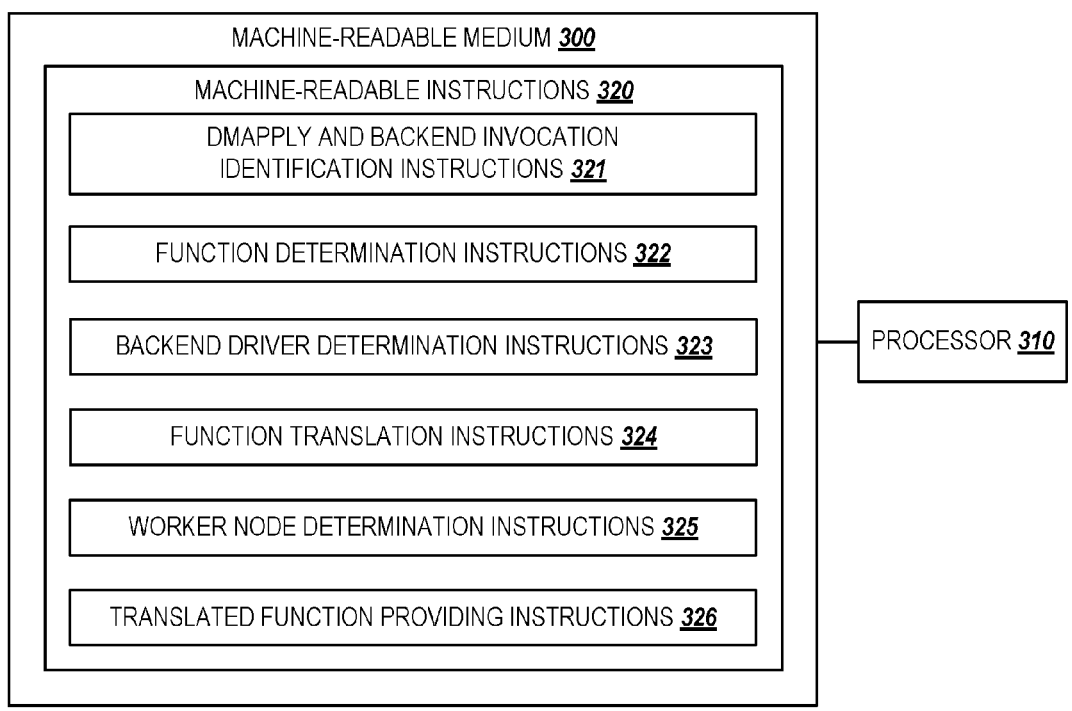
FIG. 3 is a block diagram of an example machine-readable medium for distributed computing in R.

FIG. 3 is a block diagram of an example machine-readable medium 300 for distributed computing in R. Machine-readable medium 300 may be communicatively coupled to a processor 310. Machine-readable medium 300 and processor 310 may, for example, be included as part of computing system 100 illustrated in FIG. 1. Although the following descriptions refer to a single processor and a single machine-readable storage medium, the descriptions may also apply to a system with multiple processors and/or multiple machine-readable storage mediums. In such examples, the instructions may be distributed (e.g., stored) across multiple machine-readable storage mediums and the instructions may be distributed (e.g., executed by) across multiple processors.

Processor 310 may be central processing units (CPUs), microprocessors, and/or other hardware devices suitable for retrieval and execution of instructions stored in machine-readable storage medium 300. In the example shown in FIG. 3, processor 310 may fetch, decode, and execute machine-readable instructions 320 (including instructions 321-326) for distributed computing in R. As an alternative or in addition to retrieving and executing instructions, processor 310 may include electronic circuits comprising a number of electronic components for performing the functionality of the instructions in machine-readable storage medium 300. With respect to the executable instruction representations (e.g., boxes) described and shown herein, it should be understood that part or all of the executable instructions and/or electronic circuits included within one box may, in some examples, be included in a different box shown in the figures or in a different box not shown.

Machine-readable storage medium 300 may be any electronic, magnetic, optical, or other physical storage device that stores executable instructions. Thus, machine-readable storage medium 300 may be, for example, Random Access Memory (RAM), a nonvolatile RAM (NVRAM) (e.g., RRAM, PCRAM, MRAM, etc.), an Electrically-Erasable Programmable Read-Only Memory (EEPROM), a flash memory, a storage drive, an optical disc, and the like. Machine-readable storage medium 300 may be disposed within a computing system (e.g., computing system 100 of FIG. 1). In this situation, the executable instructions may be "installed" on the computing system. Alternatively, machine-readable storage medium 300 may be a portable, external or remote storage medium, for example, that allows a computing system to download the instructions from the portable/external/remote storage medium. In this situation, the executable instructions may be part of an "installation package". As described herein, machine-readable storage medium 300 may be encoded with executable instructions for distributed computing in R.

Referring to FIG. 3, dmapply and backend invocation identification instructions 321, when executed by a processor (e.g., 310), may cause the processor to identify a dmapply operation and an invocation of a distributed computing backend. Function determination instructions 322, when executed by a processor (e.g., 310), may cause the processor to determine a function referenced in the dmapply operation. Backend driver determination instructions 323, when executed by a processor (e.g., 310), may cause the processor to determine a distributed backend driver associated with the invoked distributed computing backend among a plurality of distributed backend drivers. Function translation instructions 324, when executed by a processor (e.g., 310), may cause the processor to translate, using the determined distributed backend driver, the determined function to a function native to an R API of the invoked distributed computing backend. Worker node determination instructions 325, when executed by a processor (e.g., 310), may cause the processor to determine worker nodes of the invoked distributed computing backend having partitions of a distributed data set referenced in the dmapply operation. Translated function providing instructions 326, when executed by a processor (e.g., 310), may cause the processor to provide the translated function to the determined worker nodes of the invoked computation backend to perform the translated function on the partitions of the distributed data set referenced in the dmapply operation.

Figure 4:
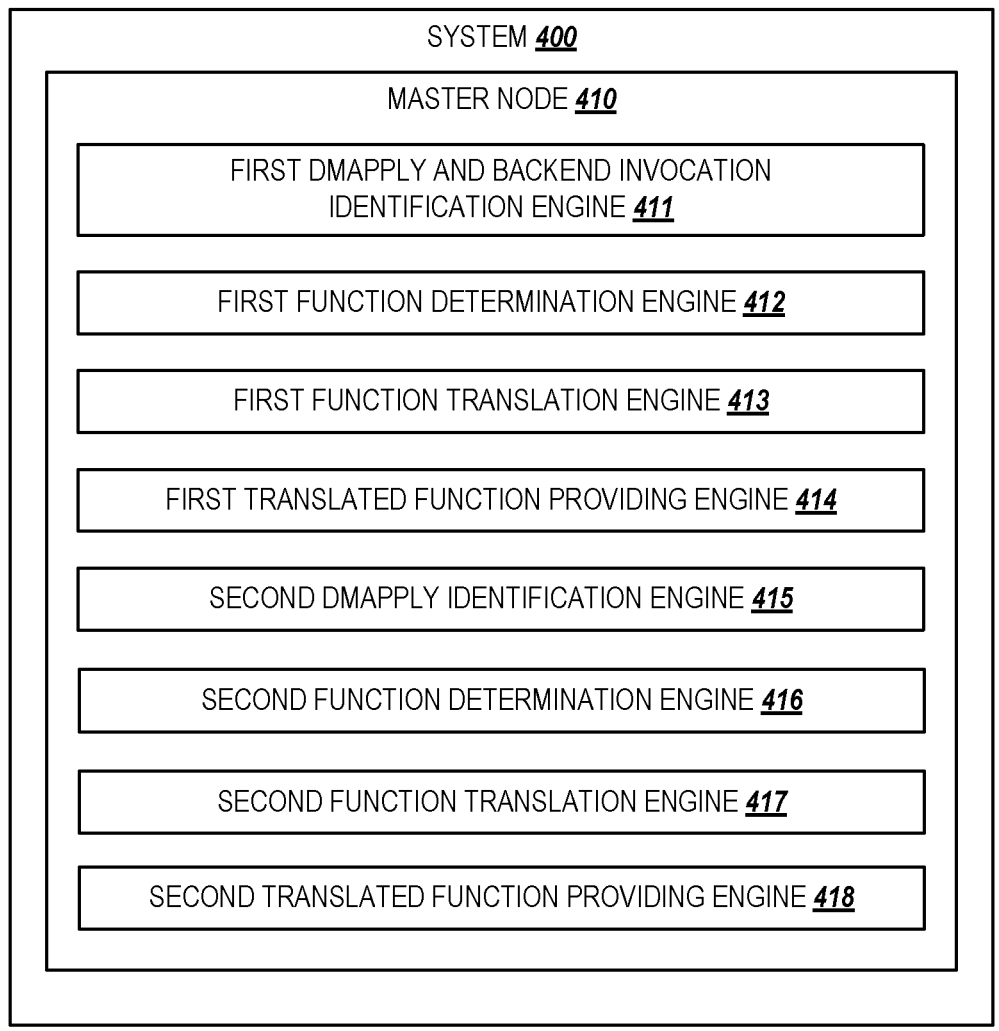
FIG. 4 is a block diagram of an example system for distributed computing in R.

FIG. 4 is a block diagram depicting an example system 400, including a master node 410, for distributed computing in R. Master node 410 may include a first dmapply and backend invocation identification engine 411, a first function determination engine 412, a first function translation engine 413, a first translated function providing engine 414, a second dmapply identification engine 415, a second function determination engine 416, a second function translation engine 417, and a second translated function providing engine 418. In some examples, master node 410 may be implemented by master node 110 of FIG. 1.

The term "engine", as used herein in reference to components 411-418, refers to a combination of hardware and programming that performs a designated function. For example, the hardware of each engine may include one or both of a processor and a machine-readable storage medium, while the programming is instructions or code stored on the machine-readable storage medium and executable by the processor to perform the designated function.

Referring to FIG. 4, first dmapply and backend invocation identification engine 411 may include a processor and program instructions that, when executed, cause the processor to identify a first dmapply operation and an invocation of a distributed computing backend. First function determination engine 412 may include a processor and program instructions that, when executed, cause the processor to determine a first function referenced in the first dmapply operation. First function translation engine 413 may include a processor and program instructions that, when executed, cause the processor to translate, using a distributed backend driver associated with the invoked distributed computing backend, the first function to a first function native to an R API of the invoked distributed computing backend. First translated function providing engine 414 may include a processor and program instructions that, when executed, cause the processor to provide the translated first function to the invoked distributed computing backend to generate an intermediate distributed data set by performing the translated first function on an initial distributed data set referenced in the first dmapply operation. Second dmapply identification engine 415 may include a processor and program instructions that, when executed, cause the processor to identify a second dmapply operation. Second function determination engine 416 may include a processor and program instructions that, when executed, cause the processor to determine a second function referenced in the second dmapply operation. Second function translation engine 417 may include a processor and program instructions that, when executed, cause the processor to translate, using the distributed backend driver associated with the invoked distributed computing backend, the second function to a second function native to the R API of the invoked distributed computing backend. Second translated function providing engine 418 may include a processor and program instructions that, when executed, cause the processor to provide the translated second function to the invoked distributed computing backend to generate a final distributed data set by performing the translated second function on the intermediate distributed data set.

The foregoing disclosure describes a number of example implementations for distributed computing in R. The disclosed examples may include systems, devices, computer-readable storage media, and methods for distributed computing in R. For purposes of explanation, certain examples are described with reference to the components illustrated in FIGS. 1-4. The functionality of the illustrated components may overlap, however, and may be present in a fewer or greater number of elements and components. Further, all or part of the functionality of illustrated elements may co-exist or be distributed among several geographically dispersed locations.

Moreover, the disclosed examples may be implemented in various environments and are not limited to the illustrated examples. Further, the sequence of operations described in connection with FIG. 2 is an example and is not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for distributed computing in R, the method performed by at least one processor and comprising:
identifying a distributed multivariate apply (dmapply) operation and an invocation of a distributed computing backend;
determining a function referenced in the dmapply operation;
translating, using a distributed backend driver associated with the invoked distributed computing backend, the determined function to a function native to an R application programming interface (API) of the invoked distributed computing backend; and
providing the translated function to the invoked distributed computing backend to perform the translated function on a distributed data set referenced in the dmapply operation.

2. The method of claim 1, wherein providing the translated function to the invoked distributed computing backend includes:
providing the translated function to worker nodes of the invoked distributed computing backend to perform the translated function.

3. The method of claim 2, wherein each worker node of the worker nodes performs the translated function on a partition of the distributed data set referenced in the dmapply operation.

4. The method of claim 1, wherein the dmapply operation specifies a subset of partitions included in the distributed data set, and the method comprises:
providing the translated function to the invoked distributed computing backend to perform the translated function on the specified subset of partitions included in the distributed data set.

5. The method of claim 4, wherein:
the distributed data set is a distributed array;
the dmapply operation specifies a subset of partitions included in the distributed array; and
and the method comprises providing the translated function to each distributed node of the invoked distributed computing backend to perform the translated function on a partition of the specified subset of partitions included in the distributed array.

6. The method of claim 5, wherein the specified subset of partitions included in the distributed array are at least one of row partitions and block partitions.

7. The method of claim 1, wherein the distributed data set includes at least one of a distributed array, a distributed data frame, and a distributed list.

8. The method of claim 1, comprising:
providing the translated function to the invoked distributed computing backend to perform the translated function on a plurality of distributed data sets referenced in the dmapply operation.

9. The method of claim 1, comprising:
providing instructions to the invoked distributed computing backend to perform the translated function on each element of the distributed data set referenced in the dmapply operation based on a type of distributed data structure associated with the distributed data set referenced in the dmapply operation.

10. The method of claim 9, wherein:
the distributed data set referenced in the dmapply operation is a distributed list and the method includes providing instructions to the invoked distributed computing backend to perform the translated function on each row of the distributed data set referenced in the dmapply operation;
the distributed data set referenced in the dmapply operation is a distributed array and the method includes providing instructions to the invoked distributed computing backend to perform the translated function on each cell of the distributed data set referenced in the dmapply operation; or
the distributed data set referenced in the dmapply operation is a distributed fram and the method includes providing instructions to the invoked distributed computing backend to perform the translated function on each column of the distributed data set referenced in the dmapply operation.

11. A non-transitory machine-readable storage medium storing instructions that, when executed by at least one processor, cause the at least one processor to:
identify a distributed multivariate apply (dmapply) operation and an invocation of a distributed computing backend;
determine a function referenced in the dmapply operation;
determine a distributed backend driver associated with the invoked distributed computing backend among a plurality of distributed backend drivers;
translate, using the determined distributed backend driver, the determined function to a function native to an R application programming interface (API) of the invoked distributed computing backend;
determine worker nodes of the invoked distributed computing backend having partitions of a distributed data set referenced in the dmapply operation; and
provide the translated function to the determined worker nodes of the invoked computation backend to perform the translated function on the partitions of the distributed data set referenced in the dmapply operation.

12. The non-transitory machine-readable storage medium of claim 11, wherein the instructions, when executed by the at least one processor, cause the at least one processor to:
translate, using the determined distributed backend driver, the determined function to a function native to an R API of the invoked distributed computing backend based on a direct mapping between the determined function and the native function.

13. The non-transitory machine-readable storage medium of claim 11, wherein the instructions, when executed by the at least one processor, cause the at least one processor to:
provide the translated function and a global data set referenced in the dmapply operation to the determined worker nodes of the invoked computation backend to perform the translated function on the partitions of the distributed data set referenced in the dmapply operation using the global data set as input to the translated function.

14. The non-transitory machine-readable storage medium of claim 11, wherein the instructions, when executed by the at least one processor, cause the at least one processor to:
determine that a global data set referenced in the dmapply operation is a distributed data structure; and
in response to determining that the global data set referenced in the dmapply operation is a distributed data structure, determine worker nodes of the invoked distributed computing backend having partitions of the distributed data structure.

15. The non-transitory machine-readable storage medium of claim 14, wherein the instructions, when executed by the at least one processor, cause the at least one processor to:
provide instructions to the worker nodes determined to have partitions of the distributed data structure to provide the partitions of the distributed data structure to the worker nodes determined to have partitions of a distributed data set referenced in the dmapply operation to perform the translated function on the partitions of the distributed data set referenced in the dmapply operation using the provided partitions of the distributed data structure as input to the translated function.

16. A system, comprising:
a master node to:
identify a first distributed multivariate apply (dmapply) operation and an invocation of a distributed computing backend;
determine a first function referenced in the first dmapply operation;
translate, using a distributed backend driver associated with the invoked distributed computing backend, the first function to a first function native to an R application programming interface (API) of the invoked distributed computing backend; and
provide the translated first function to the invoked distributed computing backend to generate an intermediate distributed data set by performing the translated first function on an initial distributed data set referenced in the first dmapply operation;
identify a second dmapply operation;
determine a second function referenced in the second dmapply operation;
translate, using the distributed backend driver associated with the invoked distributed computing backend, the second function to a second function native to the R API of the invoked distributed computing backend; and
provide the translated second function to the invoked distributed computing backend to generate a final distributed data set by performing the translated second function on the intermediate distributed data set.

17. The system of claim 16, wherein the master node is to:
determine a first global data set referenced in the first dmapply operation; and
determine a second global data set referenced in the second dmapply operation.

18. The system of claim 17, wherein the master node is to:
provide the translated first function and the first global data set to the invoked distributed computing backend to generate the intermediate distributed data set by performing the translated first function on the initial distributed data set using the first global data set as input to the first translated function.

19. The system of claim 17, wherein the first global data set is a vector and the second global data set is a list.

20. The system of claim 17, wherein the first global data set includes a plurality of partitions of a first distributed data set and the second global data set includes an entire second distributed data set.

* * * * *